(12) United States Patent
Appel et al.

(10) Patent No.: US 8,338,523 B2
(45) Date of Patent: Dec. 25, 2012

(54) THERMOPLASTIC MOLDING MATERIAL AND MOLDED BODY MADE OF THE MATERIAL

(75) Inventors: Reiner Appel, Oberasbach (DE); Harald Von Godin, Oberasbach (DE); Gerhard Lugert, Nürnberg (DE)

(73) Assignee: Faber Castell AG, Stein (DE)

( * ) Notice: Subject to any disclaimer, the term of this patent is extended or adjusted under 35 U.S.C. 154(b) by 1057 days.

(21) Appl. No.: 11/931,494

(22) Filed: Oct. 31, 2007

(65) Prior Publication Data

US 2008/0281020 A1    Nov. 13, 2008

(30) Foreign Application Priority Data

Oct. 31, 2006   (EP) .................................... 06022696

(51) Int. Cl.
*C08F 3/22*   (2006.01)

(52) U.S. Cl. ........................................................ 524/487

(58) Field of Classification Search .................... 524/487
See application file for complete search history.

(56) References Cited

U.S. PATENT DOCUMENTS 2,988,784 A    6/1961    Lorenian

FOREIGN PATENT DOCUMENTS

| DE | 1956625 | * | 5/1971 |
| DE | 1956625 A1 | | 5/1971 |
| DE | 1770777 A1 | | 12/1971 |
| DE | 19855325 | * | 6/1999 |
| DE | 19855325 A1 | | 6/1999 |

* cited by examiner

*Primary Examiner* — Robert D. Harlan

(74) *Attorney, Agent, or Firm* — Laurence A. Greenberg; Werner H. Stemer; Ralph E. Locher

(57) ABSTRACT

A thermoplastic molding material contains between 10% and 35% by weight of an ethylene copolymer wax with hydrophilic groups, with a melting point between 75° C. and 110° C. and cellulose containing fibers with a share of between 45% and 90% by weight relative to the dry mass of the fibers. Molded bodies may be formed from the molding material, such as pencil casings.

15 Claims, No Drawings

THERMOPLASTIC MOLDING MATERIAL AND MOLDED BODY MADE OF THE MATERIAL

CROSS-REFERENCE TO RELATED APPLICATION

This application claims the priority, under 35 U.S.C. §119, of European patent application EP 06 022 696.6, filed Oct. 31, 2006; the prior application is herewith incorporated by reference in its entirety.

BACKGROUND OF THE INVENTION

Field of the Invention

The invention relates to a thermoplastic molding material with a polymer matrix and a filling material imbedded therein. The invention also relates to a molded body made of the thermoplastic material of the invention. The molding materials or, respectively, the basic materials resulting therefrom are also called compounds. In order to achieve high physical strengths, filamentous fillers are utilized. For the production of molded bodies, melting of the polymer matrix and thorough blending with the fillers are required. If, as intended by the invention, wood-like compounds are to be produced, cellulose-containing fibers or fibers entirely made of cellulose (hereinafter referred to as cellulose fibers) are suitable, for example wood flour or fibers made from other lignified plant parts. The problem in this respect is that the temperature required for the melting of the polymer matrix in the case of conventional polymers such as polycarbonate or polypropylene is so high that there is the danger of damaging the cellulose fibers. To obtain a firm bonding between fibers and polymer matrix, the polymer material must enter into a firm bonding relationship with the fibers which requires the use of bonding agents due to the rather hydrophilic character of the cellulose fibers and the rather hydrophobic character of conventional polymer matrices. This increases the expenditures of material and money for the production of molded bodies. Moreover, bonding agents are usually unhealthful substances that are undesirable in basic commodities such as pencil casings.

Also, cellulose fibers contain residual moisture due to their hydrophilic character which counteracts a firm anchoring of the fibers in the polymer matrix as well, requiring extensive drying of the fibers. Finally, there is also the problem that while it is possible to achieve sufficient strength and stiffness with the use of a conventional polymer matrix, it is not possible to obtain additional properties that characterize the basic material wood, such as surface structure and surface feel or the behavior during machine processing, for example when sharpening pencils.

BRIEF SUMMARY OF THE INVENTION

It is accordingly an object of the invention to provide a molding material, which overcomes the above-mentioned disadvantages of the heretofore-known devices and methods of this general type and which can be turned, in particular extruded, into molded bodies with wood-like properties at a low melting and/or compounding temperature, and to propose a molded body with wood-like properties.

With the foregoing and other objects in view there is provided, in accordance with the invention, a thermoplastic molding material, comprising:

10% by weight to 35% by weight of an ethylene copolymer wax containing hydrophilic groups and having a melting point of 75° C. to 110° C.; and cellulose-containing fibers with a share of 45% by weight to 90% by weight relative to a dry mass of the fibers.

In other words, the objects of the invention are achieved with a thermoplastic molding material and a molded body formed of molded material that contains 10% by weight to 35% by weight of an ethylene copolymer wax containing hydrophile groups with a melting point of 75° C. to 110° C. and fibers containing cellulose, or made of cellulose, with a share of 45% by weight to 90% by weight, preferably 60% by weight to 90% by weight (relative to the dry mass of the fibers). After a great multitude of tests, it came as a complete surprise that a molding material of ethylene copolymer wax of the type indicated and cellulose fibers will yield a basic material that has a strength and stiffness comparable to wood, that can be easily machine-processed and that has a wood-like optical and haptic appearance.

Due to the low melting point or, respectively, the low melting range of the polymer matrix that is used, a correspondingly low processing temperature for compounding and extrusion or other shaping processes is possible, meaning that the cellulose fibers are hardly stressed thermally. Moreover, the low processing temperature permits the addition of temperature-sensitive additives such as, for example, wood aromas.

Therefore, ethylene copolymer waxes with a melting point and/or melting range of 75° C. to 85° C. are preferably used. It is also surprising that the cellulose fibers containing polar groups (OH groups) bond firmly with the polymer matrix composed of the ethylene copolymer wax even without the addition of bonding agents. An additional surprising effect was the fact that a firm bond can be observed in the case of fibers that still have a residual moisture contents, for example up to 15% by weight. Therefore, a prior energy-consuming drying of the fibers, for example of sawdust or wood flour, is not required. The strength of a compound can also be influenced by the length of the cellulose fibers used. Preferably, in the case of pure cellulose, fibers with a length of 70 μm to 800 μm, in particular of 70 μm to 150 μm, are selected. In the case of wood chips, a fiber length of approximately 1 mm to 2 mm will be suitable.

In addition to the cellulose fibers, a filler, in particular an inorganic filler, preferably mica, talcum and/or kaolin, may be present, for example in order to alter the specific weight of a molded body or its consistency. In this respect, a maximal contents of 10% by weight is suitable since in the event of a higher contents, the property profile achieved through the system of ethylene polymer wax/cellulose fibers, in particular the breaking resistance, could be altered too much.

For an improvement of the flow characteristics of the molding material during extrusion, it will be advantageous to admix a lubricant from the group of waxes, oils and fatty acid derivatives, with the absorption capacity of the aforementioned matrix system being reached at 15% by weight. In addition to that, smooth surfaces will result, especially through the use of fatty acid derivatives, in particular of calcium stearate.

From the molding material described above, molded bodies are produced, preferably by means of extrusion. In this respect, either a physical mixture of the source materials, i.e. essentially ethylene copolymer wax in powder and granulate form and cellulose fibers, can be compounded or extruded in a screw extruder. But it is also conceivable that the molding material is first compounded and granulated, with the granulate obtained thereby being extruded following an interim storage period or being processed in another molding process.

In the event that molded bodies of greater hardness are to be produced, this can be achieved through the addition of oxidized polyethylene. In this regard, contents levels of below 0.1% by weight hardly show any effect. In the case of contents levels of more than 8% by weight, machine processing of a molded body turns out to be increasingly more difficult which is a disadvantage, e.g. in the case of pencil casings that can be provided with a point. Strength and hardness can be adjusted to a certain extent through the addition of resins of the natural and synthetic kind, while a resin share of not more than 5% by weight should be maintained.

Preferred resins are lignin, bakelite, and ketone aldehyde condensation resins.

In principle, any bodies and/or objects and, in particularly simple fashion, string profiles such as moldings for furniture, can be produced from the molding material described. The molding material is especially well suited for the casing of pencils. The latter are usually made of wood. Wood as a natural product oftentimes has varying properties, depending on growth conditions and location, which makes maintaining quality standards difficult. On the one hand, wood can be easily glazed. Dying a pencil casing or another body over its entire thickness, on the other hand, can be achieved only with extreme difficulty, in particular if a black dye is intended. Also, the production of the usual wood-encased pencils is relatively costly. The starting point is small boards into one flat side of which parallel and laterally distanced grooves are milled. Graphite cores are placed into the grooves, and a second small board, also provided with grooves, is glued on top of the graphite-equipped board. Finally, pencil prototypes are produced from the laminate thus obtained and further processed into the final pencils having, for example, a round or hexagonal cross section. In contrast thereto, the extrusion of the molding material in accordance with the invention is much simpler. The extruded strands merely need to be cut to size and equipped with graphite cores. The latter production step can be dispensed with if the casing and the core are produced by means of coextrusion. The molding materials in accordance with the invention are virtually predestined for that purpose because, due to their low processing temperature, they permit a gentle extrusion especially of temperature-sensitive core masses, such as, for example, colored crayons and, especially, of cosmetic pencils.

Of course, the conventional production method with small boards can be used as well, one reason being the fact that corresponding facilities already exist and should be utilized. In this case, small boards are extruded instead of casings and further processed in the usual manner.

The molded bodies obtained from the proposed molding materials have a strength, breaking resistance and flexibility that is reminiscent of natural wood. Similar to wood, they can be machine-processed; pencil casings can be sharpened easily and with uniform chip formation. Particularly advantageous is the fact that the casings, unlike wood casings, do not dry out and shrink, thus avoiding the danger of the core becoming loose and falling from the casing.

A dying of the casing, which is particularly desirable in the cosmetics sector, can be achieved without any problem with almost unlimited color nuances by admixing corresponding coloring agents and/or color pigments. For a coloring or dying not only of pencil casings, inorganic pigments, in particular soot, iron oxides, ultramarine, ferri-ferrocyanide, as well as organic pigments, in particular phthalocyanin pigments, azo pigments and chinacridon pigments can be put to use.

The profiles to be produced with the described molding materials can be produced by means of direct entry of the starting materials into an extruder, with the required compounding, i.e. the melting and thorough blending of polymer matrix, fibers and, if necessary, other additives, occurring in the extruder. Of course, the compounding may occur in a separate step, for example with a speed mixer or a double screw extruder. In either case, temperatures within a range from 80° C. to 170° C., preferably within a range from 90° C. to 140° C., are maintained during processing.

Other features which are considered as characteristic for the invention are set forth in the appended claims.

Although the invention is described herein as embodied in thermoplastic molding material and molded body made of thereof, it is nevertheless not intended to be limited to the details described, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments.

DETAILED DESCRIPTION OF THE INVENTION

EXAMPLE 1

Molding Material for Wood-Colored Moldings and Molding Strips

| | |
|---|---|
| Ethylene copolymer wax (Luwax EAS 5)[1] | 28 parts by weight |
| Cellulose fibers (Lignoflok C 750)[2] | 78.8 parts by weight |

Lignoflok C 750 contains approximately 8.6% moisture; from this follows a dry mass of 72.0 parts by weight.

EXAMPLE 2

Molding Material for Pencil Casings Dyed Black

| | |
|---|---|
| Ethylene copolymer wax (Luwax EAS 3)[1] | 22.0 parts by weight |
| Oxidized polyethylene (PED 121)[3] | 4.0 parts by weight |
| Soot particles (Printex U)[4] | 2.0 parts by weight |
| Cellulose fibers (Arbocel C 100)[2] | 78.8 parts by weight |

The fiber material has a moisture contents of 8.6%. From this follows a dry mass of 72.0 parts by weight.

EXAMPLE 3

Molding Material for Furniture Moldings Dyed Black

| | |
|---|---|
| Ethylene copolymer wax (Luwax EAS 3)[1] | 19.0 parts by weight |
| Castor wax | 1.5 parts by weight |
| Calcium stearate | 1.5 parts by weight |
| Soot particles (Printex A)[4] | 2.0 parts by weight |
| Cellulose fibers (Arbocel C 32/10)[2] | 83.3 parts by weight |

Here, the fiber material has a moisture content of 8.8% by weight. From this follows a dry mass of 76.0 parts by weight.

In all examples, the raw materials are entered individually into a double screw extruder in the amount prescribed by formulation, and profiles (profile moldings, furniture moldings and/or pencil casings) are extruded therefrom. The extrusion temperature is about 140° C. At this temperature, at least part of the water present in the fibers will evaporate.

Manufacturers:
1) Luwax EAS 5 (Ex. 1) and Luwax EAS 3 (Ex. 2, 3) are available from BASF, Ludwigshafen, Germany;
2) Lignoflok C 750 (Ex. 1), Arbocel C 100 (Ex. 2), and Arbocel C 32/10 (Ex. 3) are available from J. Rettenmeier & Söhne GmbH & Co. KG, Rosenberg, Germany;
3) PED 121 (Ex. 2) is available from CLARIANT AG, Frankfurt/Main; Germany;
4) Printex U (Ex. 2) and Printex A (Ex. 3) are available from Degussa, Frankfurt am Main, Germany.

The invention claimed is:

1. A thermoplastic molding material, comprising:
a polymer matrix formed primarily or entirely of an ethylene copolymer wax containing hydrophilic groups and having a melting point of 75° C. to 110 ° C.; and
cellulose-containing fibers embedded in said polymer matrix;
wherein said ethylene copolymer wax is present in the molding material with a share of 10% to 35% by weight and said cellulose-containing fibers are present with a share of 45% to 90% by weight relative to a dry mass of said fibers.

2. The molding material according to claim 1, wherein said fibers are present in a share of 60% by weight to 90% by weight, relative to the dry mass of the fibers.

3. The molding material according to claim 1, wherein said ethylene copolymer wax has a melting point of 75° C. to 85° C.

4. The molding material according to claim 1, which further comprises at least one filler in addition to said fibers.

5. The molding material according to claim 4, which comprises at least one inorganic filler.

6. The molding material according to claim 4, which comprises a maximum of 10% by weight of filler.

7. The molding material according to claim 1, which further comprises a lubricant.

8. The molding material according to claim 7, wherein said lubricant is selected from the group consisting of waxes, oils, and fatty acid derivatives.

9. The molding material according to claim 7, wherein said lubricant has a maximum share of 15% by weight.

10. The molding material according to claim 1, which comprises oxidized polyethylene.

11. The molding material according to claim 10, wherein a share of said oxidized polyethylene is 0.1% by weight to 8% by weight.

12. A molded body formed by extrusion of a molding material according to claim 1.

13. The molded body according to claim 12, formed into a casing for a writing implement, a drawing implement, a painting implement, or a cosmetic implement.

14. The molded body according to claim 12, which comprises a content of natural or synthetic resin.

15. The molded body according to claim 14, wherein a content of said resin is maximally 5% by weight.

* * * * *